UNITED STATES PATENT OFFICE.

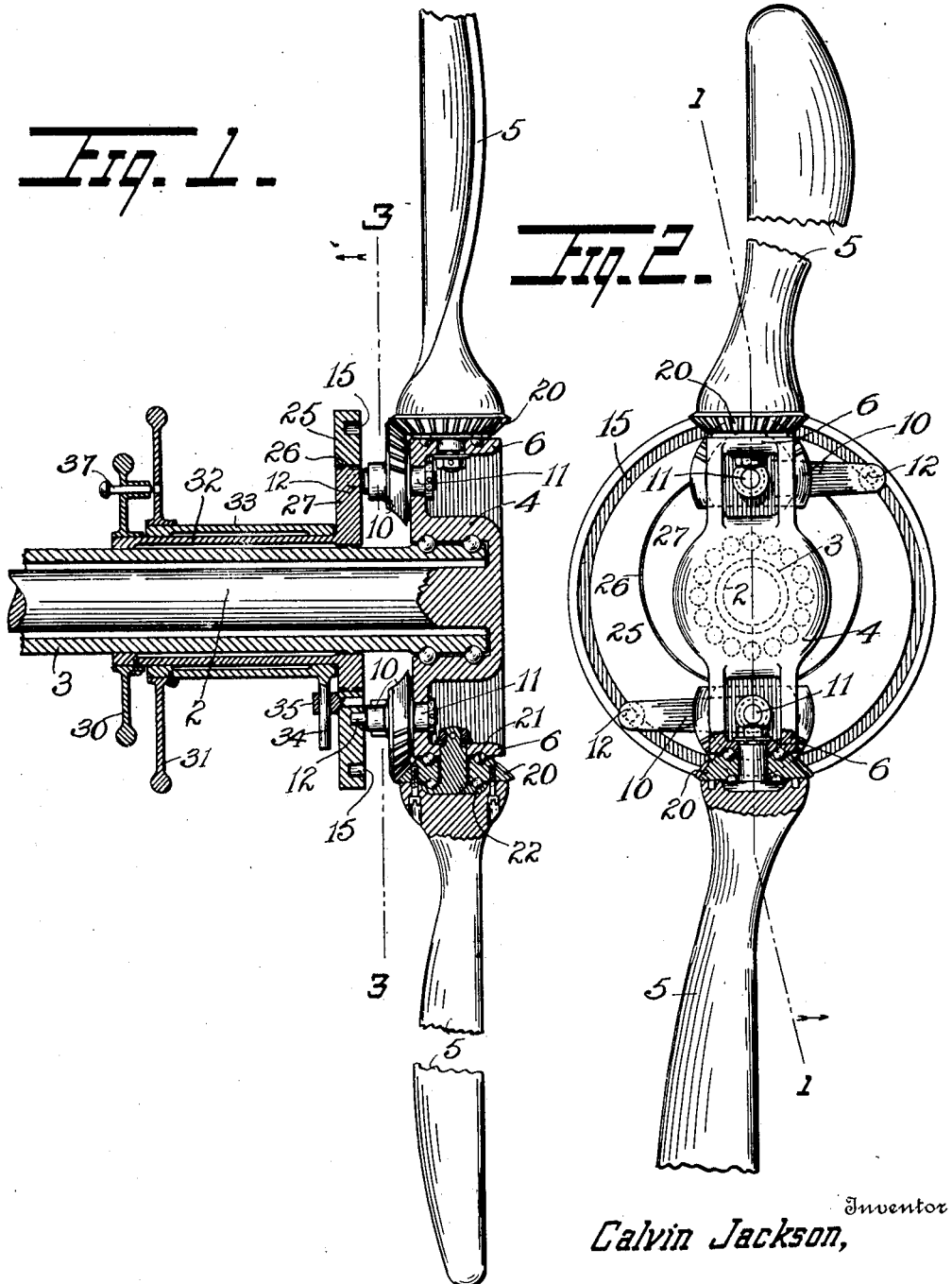

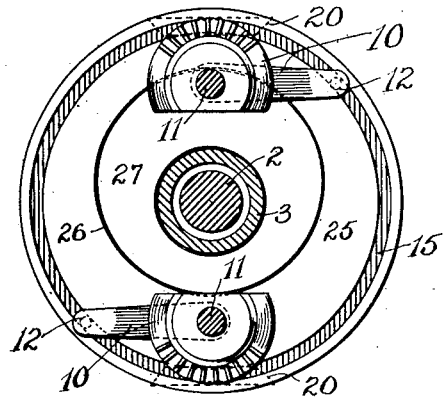
Fig. 3.
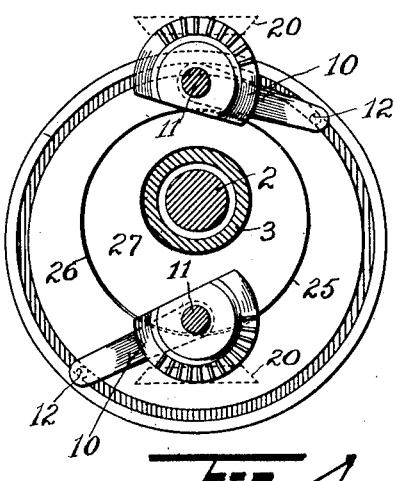
Fig. 4.
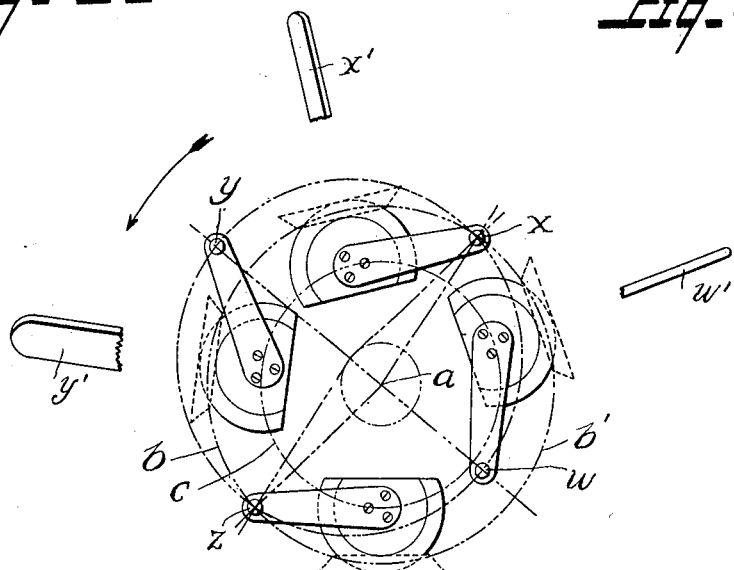
Fig. 5.
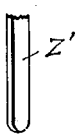
Calvin Jackson,
Inventor

CALVIN JACKSON, OF JACKSONWALD, PENNSYLVANIA.

PROPELLER MECHANISM.

1,370,587. Specification of Letters Patent. Patented Mar. 8, 1921.

Application filed February 12, 1919. Serial No. 276,455.

*To all whom it may concern:*

Be it known that I, CALVIN JACKSON, a citizen of the United States, residing at Jacksonwald, in the county of Berks and State of Pennsylvania, have invented certain new and useful Improvements in Propeller Mechanism, of which the following is a specification.

My invention relates to propeller mechanism adapted more particularly for aerial machines, the main object of my improvements being to provide for automatically shifting the line of thrust exerted by the propeller during its revolutions, so as to effect vertical or horizontal steering thereby as may be desired.

It has been heretofore recognized that provision for varying the pitch angle of propellers during operation would advantageously affect the performance, though no such adjustable propellers have yet come into actual service so far as I am aware; and propeller blades rotatable on their own axes during revolution of the propeller have been devised. My invention provides however, in its full employment, for operating the propeller either with each blade employed maintained at its normal angle of attack throughout each revolution as required for ordinary service; or with such angle of attack automatically so varied during each revolution as to shift the line of thrust outward in any desired direction from the axis of rotation, and to any desired extent within determined limits, so as to effect the steering of the machine in any desired plane and direction; the normal angle of attack being resumed by each blade whenever it is swung into a plane at right angles to the steering plane determined by such shifting of the line of thrust. In providing for such varied operation of the propeller I employ an adjustable blade, and means for automatically imparting thereto any determined slight oscillating or to-and-fro turning movement on its own axis whereby its normal angle of attack is succsssively increased and diminished during determined portions of each revolution, as fully set forth hereinafter in connection with the accompanying drawing; and the subjoined claims clearly set forth the novel features of the invention.

Figure 1 is a longitudinal-sectional view of a construction illustrating my invention; two blades being indicated and the adjusting means therefor being shown as set to maintain their normal angle of attack.

Fig. 2 is an end view of the same.

Fig. 3 is a cross-section mainly on the line 3—3 of Fig. 1.

Fig. 4 is a similar view to Fig. 3, but showing the adjusting means set to produce the maximum oscillating movement.

Fig. 5 is a diagrammatic view indicating the changes in the angle of attack of a blade which are produced in the course of one complete revolution when the blade-adjusting means are correspondingly set.

The propeller shaft 2, as indicated, extends through a frame tubing 3 on the end of which the propeller hub 4 is mounted. Separately formed screw blades 5, 5 are shown secured to opposite flanges 6, 6 on said hub so that each is capable of turning movement on its own axis as controlled by an engaging lever device 10 pivoted at 11 to the propeller hub and itself controlled by engagement of its lever end 12 in a circular guide-way 15 adjustably fixed upon the frame tubing 3.

In aerial propellers the pitch angle of the blades ordinarily provides a fixed so-called angle of attack of about four degrees, which produces the required service thrust. To provide for shifting the line of thrust from the normal (*i. e.* from the axis of rotation) sufficiently to effect steering as stated, only a slight to-and-fro turning of the blade during each revolution is needed. In the construction shown however each blade is rotatably secured to the propeller hub, being provided with a bevel-gear base plate 20 which serves for engagement of the pivotally operated lever device 10 in addition to providing opposite bearings 21, 22 for maintaining the adjustable blade in radial position; though only a few teeth of said gear may be actually engaged by the meshing teeth of said device 10 because of the limited blade-oscillating movement practically required for steering.

The effecting of such oscillating movement, the extent of it, and the positions in each revolution of the propeller at which the maximum and minimum changes of the normal angle of attack is produced, are controlled by adjustment of the relatively fixed guide-way 15 in which the lever ends 12 of the blade-engaging devices 10 are always engaged.

For ordinary service said guide-way is set to a position concentric with the axis of rotation, as indicated in Figs. 1, 2 and 3; in which case the normal pitch of the blade is maintained as no turning effect is produced. This normal pitch is determined by, and may obviously be varied by changing, the length of the guide-way engaging lever of the blade engaging device 10; or by engaging a different tooth of gear 20 with the lever device 10.

To provide for effecting any desired eccentric setting of the circular guide-way 15, I form the latter on a disk 25 having an eccentric opening 26 which serves as a bearing for its rotation upon an inner eccentric 27 mounted upon the frame tubing 3. The eccentricities of the two parts are made equal so that they may be set to neutralize each other and thereby position the guide-way 15 concentric with the propeller shaft, as shown in Figs. 1, 2 and 3; or they may be set to coact so as to either provide the maximum eccentricity of the guide-way indicated in Fig. 4, or any lesser eccentricity, set in any desired direction from the axis of rotation. The relative setting of these two eccentric parts may be effected by the operator in any convenient manner, the showing merely indicating separate hand wheels 30, 31 respectively whereby they may be separately set to proper indicated positions for a determined extent of oscillating blade movement, and for the plane in which the maximum and minimum pitch angles are to be produced by such movement. The wheel 30 is shown as fixed to a sleeve extension 32 of the inner eccentric 27, while the wheel 31 is fixed to an outer sleeve 33 having a slide-pin engagement 34—35 with the adjustable guide-way disk 25. The setting of the two eccentric parts may be facilitated by providing for their joint movement when desired, as for instance by means of an engaging device 37 applied to the operating wheels as indicated.

The series of changes effected in the pitch angle of a blade thus automatically oscillated, during a cycle measured by one revolution of the propeller, is indicated diagrammatically in Fig. 5, where $a$ indicates the axis or fixed center of rotation of the propeller $b$ the center line of the circular guide-way 15 as eccentrically set by adjustment of the two eccentric parts 25, 27, and $c$ the circular path of the pivotal center of blade-oscillating device 10.

The lever end of this device in traversing the eccentrically arranged guide-way 15, is swung slightly to-and-fro upon the pivotal point 11; in one direction as it rides outward to the point of greatest eccentricity, and in the reverse direction as it rides inward to the point of least eccentricity; thus producing a corresponding to-and-fro movement of the blade-engaging portion of said device, and consequently of the blade upon its own axis. Thus in position $w$ of this lever end of the device 10, the blade will be set to the minimum pitch angle which it assumes during each revolution of the propeller; in position $x$ it will be set to the midway or normal pitch angle; and in position $y$ to the maximum pitch angle; in position $z$ again to the normal diametrically opposite the position $x$ normal; after which it returns to position $w$, of minimum angle, to renew the cycle. In the diagram this minimum pitch angle of the blade is, for convenience, indicated by a full edge view $w'$, though for aerial service the theoretical pitch angle would preferably be maintained and the angle of attack only be more or less eliminated. The maximum pitch angle $y'$ of position $y$, would be as much greater than the normal pitch angle $x'$ and $z'$ of positions $x$ and $z$ as the pitch angle of position $w$ is less than the normal. The line of thrust will in all cases be shifted from the axis of rotation toward the blade position of maximum pitch angle; sidewise for horizontal steering, up or down for vertical steering, or in any inclined plane determined by the set of the guide-way relative to the center of propeller rotation; the blade however resuming its normal angle of attack in every revolution whenever it assumes a position at right angles to the determined steering plane.

It will be readily understood that my invention enables an operator to readily steer a machine to which it is applied in any desired plane, by merely effecting a greater or less shifting in the desired direction of the line of thrust exerted by the propeller, and to accomplish this without sacrificing any efficiency; also by thus shifting the line of thrust, balancing and banking for turns may be automatically provided for.

The specific mechanism and application set forth may obviously be readily varied without departing from the invention as particularly defined in the claims.

What I claim is:

1. In a variable-thrust propeller mechanism, a propeller having an oscillatingly adjustable screw blade, and means for automatically adjusting said blade during each revolution so as to produce a parallel line of thrust located at variable distances from the axis of rotation and on different radial lines as determined.

2. In a variable-thrust propeller mechanism, a propeller having an oscillatingly adjustable screw blade, and means for automatically adjusting said blade during each revolution so as to produce a parallel line of thrust having any determined relation to the axis of rotation within a determined circular field.

3. In a variable-thrust propeller mechanism, a propeller having an oscillatingly adjustable screw blade, relatively fixed adjusting means operatively connected to said blade to impart thereto a to and fro turning movement during each half revolution of the propeller whereby its normal angle is successively increased and diminished to a determined maximum and minimum respectively; and means for setting said adjusting means to produce a parallel line of thrust having any determined relation to the axis of rotation within a determined circular field.

4. In a variable-thrust propeller mechanism, a propeller having an oscillatory adjustable screw blade, relatively fixed adjusting means operatively connected to said blade to impart thereto a to and fro turning movement during each half revolution of the propeller whereby its normal angle is successively increased and diminished to a determined maximum and minimum respectively; and means for setting said adjusting means to produce a parallel line of thrust having any determined relation to the axis of rotation within a determined circular field, and to vary such to and fro turning movement of the propeller.

5. In a variable-thrust propeller mechanism, a propeller having a plurality of oscillatingly adjustable screw blades, and means for automatically oscillating said blades synchronously during each revolution to produce a parallel line of thrust located at variable distances from the axis of rotation and on different radial lines as determined.

6. In combination with a propeller having an adjustable screw blade; adjusting means therefor comprising a blade-engaging device pivotably carried therewith and provided with a lever extension, a relatively fixed circular guide-way concentric or eccentric with the axis of rotation.

7. In combination with a propeller having an adjustable screw blade; adjusting means therefor comprising a blade-engaging device pivotably carried therewith and provided with a lever extension, and a relatively fixed circular guide-way for said lever extension eccentrically mounted upon an eccentric which is itself independently rotatable upon the axis of rotation.

8. In combination with a propeller having an adjustable screw blade; adjusting means therefor comprising a blade-engaging device pivotably carried therewith and provided with a lever extension, and a relatively fixed circular guide-way for said lever extension eccentrically mounted upon an eccentric which is itself independently rotatable upon the axis of rotation; the two eccentric parts being equal in eccentricity and being relatively settable to neutralizing or cumulating positions as desired.

In testimony whereof I affix my signature.

CALVIN JACKSON.